US006016978A

United States Patent [19]

Neuhaus

[11] Patent Number: 6,016,978

[45] Date of Patent: Jan. 25, 2000

[54] DEVICE FOR PRODUCING A STATIONARY PARTICLE CLOUD IN A SPACE PARTICULARLY AT AN UNDERPRESSURE

[75] Inventor: Dietmar Neuhaus, Duesseldorf, Germany

[73] Assignee: Deutsche Forschungscanstalt fuer Luft- ung Raumfahrt e.V., Cologne, Germany

[21] Appl. No.: 09/125,158

[22] PCT Filed: Feb. 12, 1997

[86] PCT No.: PCT/EP97/00636

§ 371 Date: Aug. 13, 1998

§ 102(e) Date: Aug. 13, 1998

[87] PCT Pub. No.: WO97/29849

PCT Pub. Date: Aug. 21, 1997

[30] Foreign Application Priority Data

Feb. 13, 1996 [DE] Germany .......................... 196 05 184

[51] Int. Cl.[7] ........................................ A01C 3/06

[52] U.S. Cl. .................................... 239/650; 239/DIG. 1; 434/300

[58] Field of Search ............................ 222/192; 239/650, 239/2.1, 14.1, DIG. 1; 434/300, 301; 422/306

[56] References Cited

U.S. PATENT DOCUMENTS

| | | | |
|---|---|---|---|
| 4,725,294 | 2/1988 | Berger | 55/270 |
| 4,848,656 | 7/1989 | Magill | 239/DIG. 1 |
| 4,872,786 | 10/1989 | Braden | 406/68 |
| 5,173,274 | 12/1992 | Owen | 422/306 |

*Primary Examiner*—Gregory L. Huson
*Attorney, Agent, or Firm*—Diller, Ramik & Wight, PC

[57] ABSTRACT

The instant device for producing a particle cloud in a space particularly at an underpressure comprises a particle chamber (14) with an accommodating compartment (16) provided to hold particles (18), the particle chamber (14) having an inlet and an outlet aperture (20,22). The inlet aperture (20) is coupled to a pressure-wave generating device (28,34) for generating a pressure wave. The pressure wave passes through the inlet aperture (20) into the accommodating compartment (16) of the particle chamber (14) and ejects the particles (18) through the outlet aperture (22).

10 Claims, 2 Drawing Sheets

Figure 1:
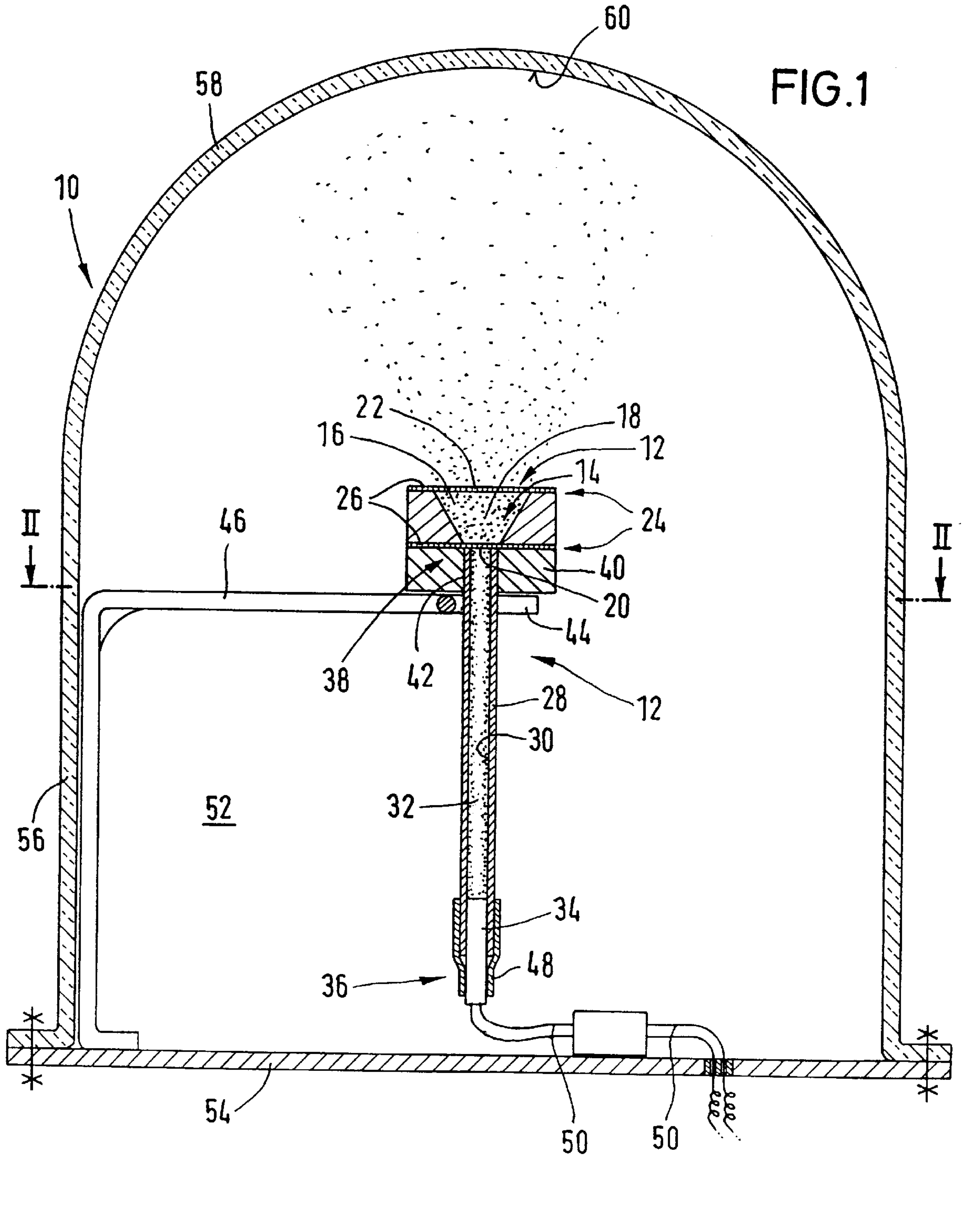

DEVICE FOR PRODUCING A STATIONARY PARTICLE CLOUD IN A SPACE PARTICULARLY AT AN UNDERPRESSURE

The invention relates to a device for producing a stationary particle cloud in a space, particularly in a space where an underpressure prevails, as is the case, e.g., in experiments in outer space.

Particle clouds are of interest particularly for quality checks and for research purposes. In both applications, it is desirable to generate controlled clouds from the small particles. Particularly under vacuum conditions or—put in broader terms—in underpressure spaces (outer space), this is not a trivial task because, with the gas/air portion in such spaces being small, the frictional forces between the particles and the gas/air cannot contribute to the cloud formation.

Known from practice is a particle spraying device wherein the dust to be discharged is arranged in a cylindrical container for solid matter and is conveyed upward in a uniform manner by means of a piston. A rotating brush made from stainless steel is arranged to remove a defined quantity of the thus lifted dust and to convey the same into a rapid air jet where the dust is fragmented by shearing forces into separate particles for further conveyence. Thus, in the above known device, a continuous air (gas) jet is required.

As known from the state of the art (cf. for instance DE-A 31 36 507), the spraying of a powdery coating material onto a surface to be coated can be effected by igniting a gas mixture (coating by high-temperature spraying). However, this technique for the spraying of powder is not suited for generating a stationary particle cloud (for experimental purposes).

It is an object of the invention to provide a device for the controlled producing of a particle cloud from a charge of existing particles and for conveying the particle cloud into a space.

According to the invention, the above object is solved by a device for producing a particle cloud in a space, particularly in a space where an underpressure prevails, wherein said device comprises a particle chamber provided to hold particles, said particle chamber having an inlet aperture and an outlet aperture, a pressure-wave generating device coupled to said inlet aperture of said particle chamber for generating a pressure wave entering said chamber through said inlet aperture and discharging the particles through said outlet aperture, and a reflection face arranged in the direction of propagation of the pressure wave passing through said outlet aperture of said particle chamber and arranged opposite to said outlet aperture of said particle chamber, for reflecting the pressure wave in the direction of said outlet aperture of said particle chamber.

According to the invention, a charge of existing particles is disagglomerated by ejecting the particles from the accommodating compartment of a particle chamber. According to the invention, this is performed by means of a pressure wave entering the accommodating compartment of the particle chamber through the inlet aperture, acting on the charge of particles contained therein and ejecting them through the outlet aperture. In the process, the gas portion which is introduced into the particle chamber by the pressure wave and then is discharged through the outlet aperture, is so small that the equilibrium pressure in the space accommodating the particle cloud is not substantially changed and remains virtually the same. For this purpose, the strength of the pressure wave is suitably adjusted in dependence on the size of the space into which the particle cloud is to be introduced.

In the invention, the geometry of at least a part of the space into which the particle cloud is introduced is designed to reflect the pressure/shock wave discharged through the outlet aperture in such a manner that the reflected shock waves will smooth the movements of the particles of the cloud. This is of advantage particularly when using the device of the invention in an underpressure space (particularly in a vacuum). The space is limited—inter alia—by a reflection face arranged opposite to the outlet aperture of said particle chamber and in the direction of propagation of the pressure/shock wave passing through said outlet aperture. This reflection face is configured to reflect the pressure/shock wave back toward the outlet aperture of the particle chamber. Suitably, this reflection face is substantially of a semispherical shape, with the particle chamber arranged substantially in the center of a (virtual) sphere enclosing the semispherical reflection face in the manner of an inner face.

Preferably, the pressure-wave generating device is a pyrotechnically operative device using a sufficient amount of an ignitable explosive charge and particularly comprising a pyrotechnical ignition hollow conduit having its inner surface provided with ignitable material (explosive) applied by vapor deposition or dusting. One end of the ignition hollow conduit has an ignition element arranged thereon. The other end of the ignition hollow conduit is arranged opposite to the inlet aperture of the particle chamber. Preferably, the ignition element is tamped with the ignition hollow conduit.

Pyrotechnical ignition hollow conduits of the above described type are known from the field of explosive materials. Such hollow conduits are provided either as flexible hoses or as rigid tubes. The ignition element is preferably provided as a spark discharge element operated by electric current. The spark generated between electrodes of the spark discharge element causes an ignition (detonation/explosion) of the explosive on the inner wall of the ignition hollow conduit, thereby generating a pressure/shock wave in the hollow conduit. This pressure/shock wave propagates within the hollow conduit and will be further increased and maintained by the sequential ignition of the explosive on the inner surface of the hollow conduit. The use of a pyrotechnically operative pressure-wave generating device of the above type is advantageous because this device is useful for generating pressure waves in a vacuum. The explosive charge (amount of explosive on the inner surface of the hollow conduit) is sufficiently small and is tuned in such manner to the space into which the particle cloud is to be introduced that the gas ballast (ignition cloud) leaking into the space during ejection of the particle charge from the particle chamber will be negligible.

Advantageously, the inlet and outlet apertures of the particle chamber are closed by closure elements. These closure elements are provided the prevent undesired leakage of particles from the accommodating compartment of the particle chamber. The closure elements may be omitted if the particle charge at the inlet and outlet apertures can be manipulated by suitable measures (compression, bonding) to the effect that no undesired leakage of particles from the particle chamber will occur. With any such measure, however, it has to be observed that the local solidification of the particle charge near the surface must not impair the disagglomeration of the particles. Further, a suitable design of the closure elements and/or a suitable connection of the closure elements to the particle chamber will allow the closure elements be moved for opening the apertures (sliders or disks). By moving the closure elements away or completely removing them briefly before putting the particle-cloud producing device into operation, these apertures are opened.

Preferably, the closure elements are porous. This guarantees a gas exchange between the accommodating compartment of the particle chamber and its environment when using the inventive device in a vacuum.

An embodiment of the invention will be described in greater detail hereunder with reference to the Figures.

Figure 2:
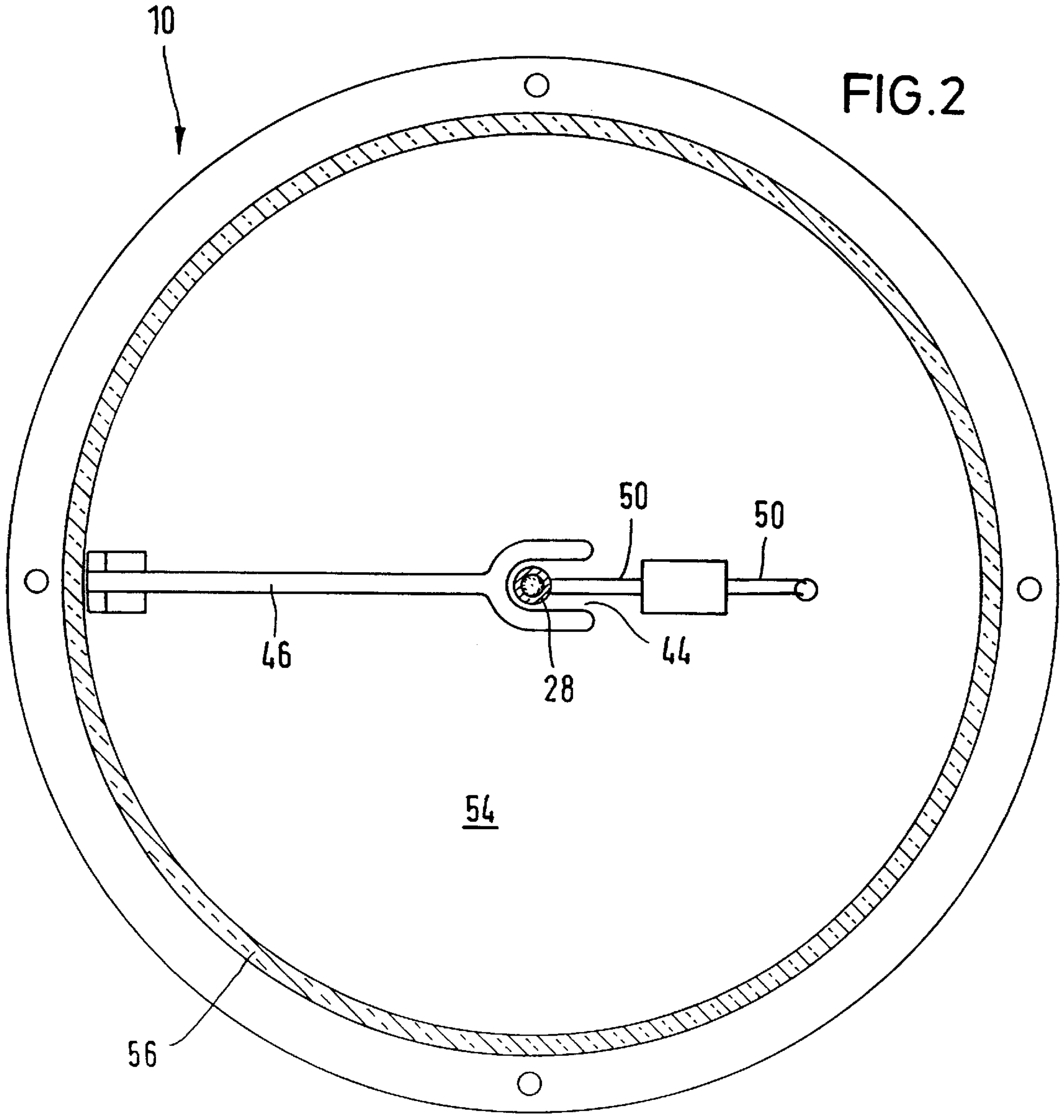

FIG. 1 is a longitudinal sectional view of the device according to the invention when used in a vacuum chamber, and FIG. 2 is view along the line II—II in FIG. 1.

The longitudinal sectional view shown in FIG. 1 illustrates a vacuum chamber 10 having arranged therein a device for producing a stationary particle cloud according to an embodiment of the invention. The device 12 comprises a particle chamber 14 having a funnel-shaped accommodating compartment 16 for a particle charge 18. Particle chamber 14 is provided with an inlet aperture 20 and an outlet aperture 22 arranged opposite thereto, said apertures forming the two end sides of the truncated cone of the funnel-shaped accommodating compartment 16. In this configuration, inlet aperture 20 forms the smaller one of the two end sides so that the accommodating compartment 16 is conically enlarged from inlet aperture 20 toward outlet aperture 22.

Both apertures 20, 22 are covered by closure elements 24 provided as porous films 26.

Arranged externally of particle chamber 14 is a pyrotechnical ignition hose 28 having its inner side 30 dusted with explosive 32. Ignition hose 28 comprises an ignition end 36 provided with an ignition element 34, and an outlet end 38 arranged opposite to inlet aperture 20 and held by a holding element 40 connected to particle chamber 14. Holding element 40 has a through aperture 42 formed therein arranged flush with the inlet aperture. Holding element 40 is arranged in a receiving portion 44 of an angled holding arm 46 projecting upward from the bottom wall of vacuum chamber 10 and being fastened thereto. Ignition hose 28 has its ignition end 36 tamped with ignition element 34, as schematically indicated at 48 by a shrunk-on hose. Ignition element 34 is provided as a spark-discharge ignition element, with its electric lines 50 guided through the wall of vacuum chamber 10 out of the inner cavity 52 of the latter.

As shown in FIG. 2, receiving portion 44 of holding arm 46 is of a suitable shape to allow the holding element 40 along with ignition hose 28 extending therefrom and along with particle chamber 14 to be laterally inserted into the fork-shaped receiving portion 44. This makes it possible to have the particle-cloud producing device 12 supported on holding arm 46 ex factory; thus, it is not required to assemble the device 12 within vacuum chamber 10.

According to FIG. 1, vacuum chamber 10 comprises a bottom wall 54 joined by a cylindrical first wall portion 56 of vacuum chamber 10. Holding arm 46 is arranged in the region of this cylindrical wall portion 56, notably in the vicinity of the end of wall portion 56 facing away from bottom wall 54. The cylindrical wall portion 56 is joined by a semispherical second wall portion 58. In this regard, the positioning of holding arm 46 within vacuum chamber 10 is provided such that the inlet aperture 20 is located substantially in the center of a (virtual) sphere enclosig the semispherical second wall portion 58. Further, the cone angle of accommodating compartment 16 is selected in a suitable manner to have the inner wall of accommodating compartment 16 extend substantially radially to the semispherical second wall portion 58.

In the following, a brief explanation will given on the operation of the device 12 of the invention when used in the vacuum chamber 10.

After the device 12 has been placed on the holding arm 46 and the portion of the vacuum chamber 10 comprising the wall portions 56 and 58 has been mounted to the bottom wall 54, an underpressure is generated in the inner cavity 52 of vacuum chamber 10 so that, due to the porous closure films 26, a gas exchange will take place between the inner cavity 52 of vacuum chamber 10 and the accommodating compartment 16 as well as the interior of the ignition hose 28. When a current is sent through the spark-discharge ignition element 34, sparks will be produced between the electrodes of ignition element 34. The ignition element is provided with two pairs of electrodes, where one of the pairs of electrodes generates a discharge with high voltage but low capacity so that the consumption of electrodes produces a sufficient quantity of ions, whereby the other one of the two pairs of electrodes triggers the discharge—with lower voltage but higher capacity and also higher energy—which will cause ignition. Thus, the above spark discharge is a process performed in several stages. The spark discharge will trigger the ignition of the explosive 32 and thus cause a pressure/shock wave in ignition hose 28. By successive detonation of the explosive 32 in the longitudinal extension of ignition hose 28, the shock wave is propagated and intensified in ignition hose 28. This shock wave will finally emerge from outlet end 38 of ignition hose 28 and hit the porous film 26 which is easily torn and thus will break open due to the mechanical stress. The shock/pressure wave will enter the accommodating compartment 16 of particle chamber 14, acting on the particle charge 18 therein. Under this pressure, the film 26 on the outlet aperture 22 of particle chamber 14 will break open so that the particles of the charge 18 are pushed out of the funnel-shaped accommodating compartment 16. The shock wave, consisting of ignition clouds and thus of combustion gases of the explosives, propagates in the axial extension of the funnel-shaped accommodating compartment 16 toward the semispherical second wall portion 58 of vacuum chamber 10 to be reflected on the inner surface 60 of second wall portion 58. The reflected shock/pressure wave acts on the ejected particles of the charge 18 and smoothes the movements of the particles so that the desired particle cloud is formed. By adjustment of the length of ignition hose 28, the strength of the shock wave and the cloud quantity can be changed. It is desirable to keep the quantity of explosive as small as possible so that the gas ballast consisting of the combustion gases is kept at a minimum.

I claim:

1. A device for producing a stationary particle cloud in a space, particularly in a space where an underpressure prevails, comprising a particle chamber (14) with an accommodating compartment (16) provided to hold particles (18), said particle chamber (14) having an inlet and an outlet aperture (20,22), a pressure-wave generating device (28,34) coupled to said inlet aperture (20) of said particle chamber (14) for generating a pressure wave entering said accommodating compartment (16) of said particle chamber (14) through said inlet aperture (20) and discharging the particles (18) through said outlet aperture (22), and a reflection face (60) arranged in the direction of propagation of the pressure wave passing through said outlet aperture (22) of said particle chamber (14) and opposite to said outlet aperture (22) of said particle chamber (14), for reflecting the pressure wave in the direction of said outlet aperture (22) of said particle chamber (14).

2. The device according to claim 1, characterized in that said inlet and outlet apertures (20,22) are each closed by a closure element (26), said closure elements (26) allowing the pressure wave to pass therethrough, and/or bursting open under the influence of the pressure wave and opening the respective aperture (20,22).

3. The device according to claim 2, characterized in that each closure element (26) is a film, particularly a porous film.

4. The device according to claim 1, characterized in that said pressure-wave generating device comprises a pyrotechnical ignition hollow conduit (28) having its inner side (30) provided with explosive material (32), one end (36) of said ignition hollow conduit (28) having an ignition element (34) arranged thereon and the other end (38) of said ignition hollow conduit (28) being arranged opposite to said inlet aperture (20) of said particle chamber (14).

5. The device according to claim 1, characterized in that said ignition element (34) along with said ignition hollow conduit (28) is tamped.

6. The device according to claim 1, characterized in that said accommodating compartment (16) of said particle chamber (14) has the shape of a truncated cone, said inlet aperture (20) being arranged on the smaller end side and said outlet aperture (22) being arranged on the larger end side of said truncated cone.

7. The device according to claim 1, characterized in that said pressure-wave generating device (28,34) comprises an explosive charge for generating the pressure wave through an explosion of said explosive charge.

8. The device according to claim 1, characterized in that said reflection face (60) is substantially a semispherical inner face and that said particle chamber (14) is arranged substantially in the center of a virtual sphere enclosing said semispherical reflection face (60).

9. The device according to claim 6, characterized in that said accommodating compartment (16) shaped as a truncated cone comprises a wall extending substantially radially to said semispherical reflection face (60).

10. The device according to claim 8, characterized in that said accommodating compartment (16) shaped as a truncated cone comprises a wall extending substantially radially to said semispherical reflection face (60).

* * * * *